United States Patent [11] 3,557,924

| [72] | Inventor | William A. Schlagel, Jr. Minneapolis |
|---|---|---|
| [21] | Appl. No. | 763,635 |
| [22] | Filed | Sept. 30, 1968 |
| [45] | Patented | Jan. 26, 1971 |
| [73] | Assignees | Alfred H. Huehn Cambridge, Minn. Schlagel Inc. Minneapolis, Minn., a corporation of Minnesota |

[54] GRAIN DISTRIBUTOR
4 Claims, 3 Drawing Figs.

| [52] | U.S. Cl. | 193/23 |
|---|---|---|
| [51] | Int. Cl. | B65g 53/04 |
| [50] | Field of Search | 193/23; 302/27, 28 |

[56] References Cited
UNITED STATES PATENTS

| 1,187,324 | 6/1916 | Ibberjon | 193/23 |
|---|---|---|---|
| 2,531,526 | 11/1950 | Patterson | 193/23 |
| 2,531,527 | 11/1950 | Patterson | 193/23 |
| 3,339,691 | 9/1967 | Schlagel et al. | 193/23 |

*Primary Examiner*—Evon C. Blunk
*Assistant Examiner*—Roger S. Gaither
*Attorney*—Adams, Cwayna & Haugen ABSTRACT: This invention relates to materials handling devices and more particularly to a grain distributor for discharging grains into selected storage bins. The unit includes a pair of housings mounted in generally vertical relation to one another, each housing provided with a plurality of outlets for discharging into the grain bins. Chute members are arranged in each of the housings and are shiftable therein to permit discharge to a selected discharge outlet. A pair of inlets are provided and one of the inlets directs grain through a discharge outlet in the first housing and the second inlet provides through a controlled flow situation with grain flow through the first housing into the second housing where it is again discharged into one of the selected discharge outlets. It is possible to discharge simultaneously from both housing sections into the same bin. Means are provided for positively controlling and containing the flow of grain at all times to prevent dust from rising and the chutes are designed for slip fit between sections thereof to ensure this dust rising prevention. Control means for lifting internal chute sections of each of the housings are provided exteriorly of the unit and positive setting of the chutes to discharge into the proper discharge outlet are provided through locating elements formed to coact between the housings and the individual chutes.

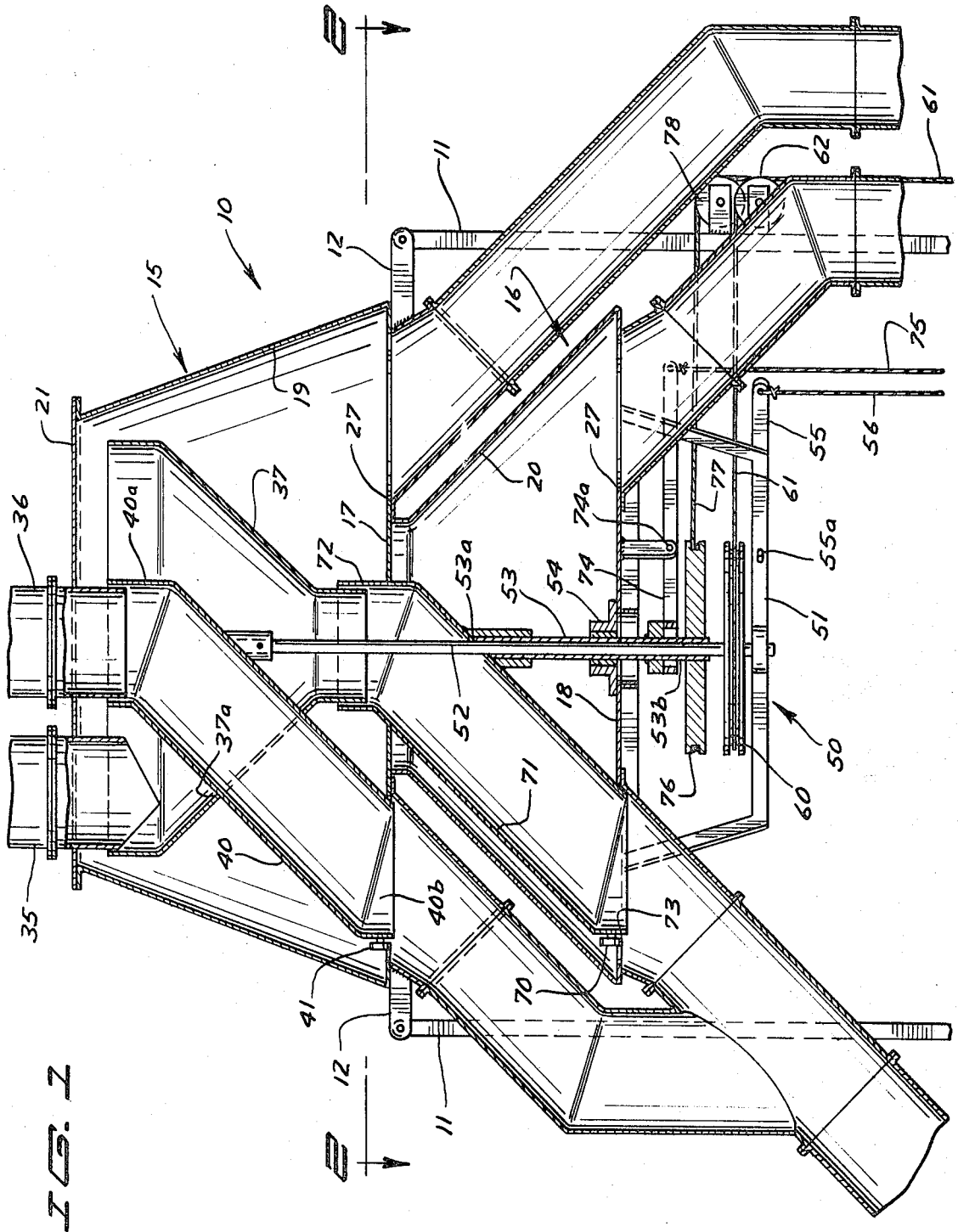

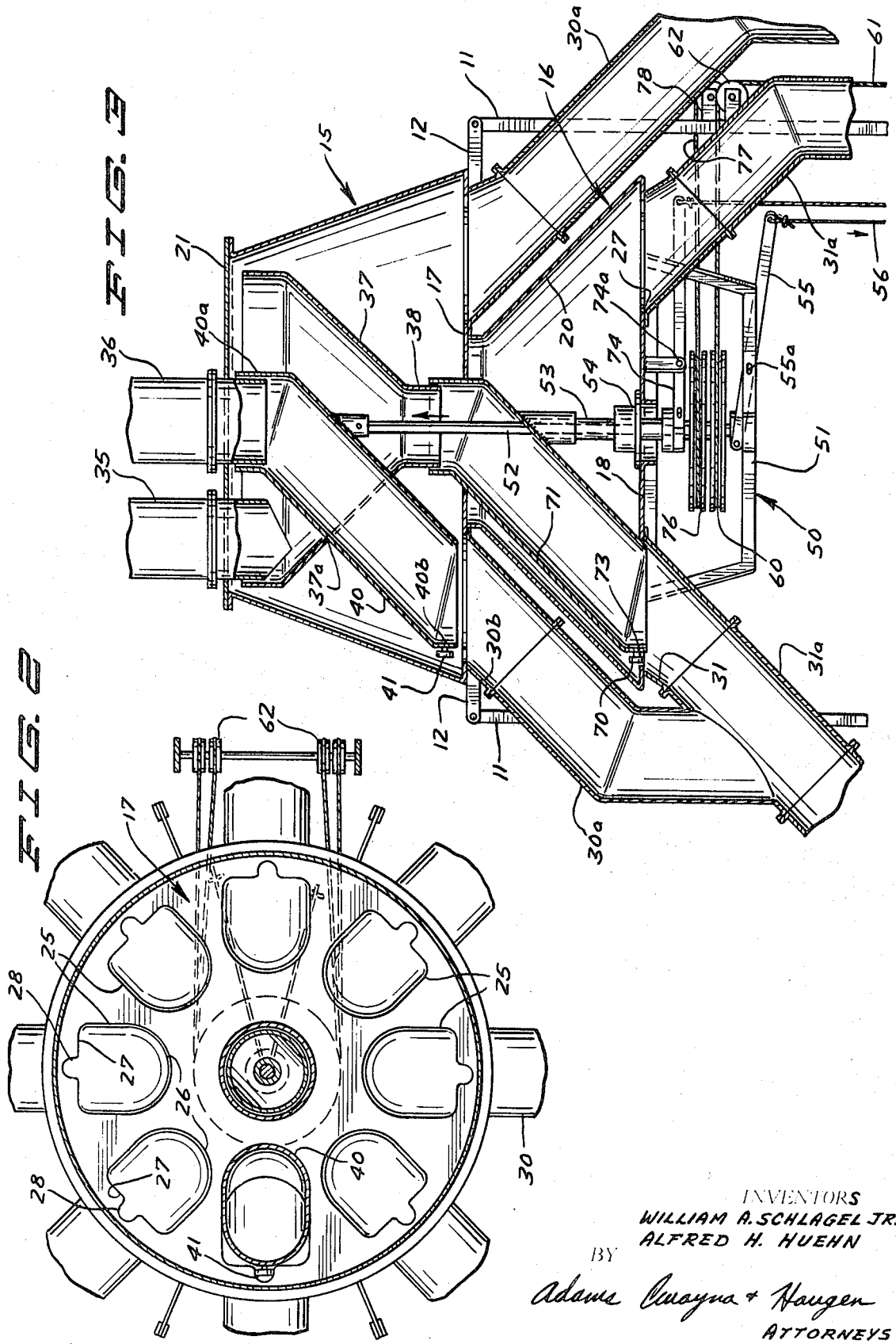

GRAIN DISTRIBUTOR

Grain distributors are generally well known in the art and applicant's distributor disclosed herein is an improvement over a grain distributor previously disclosed and claimed in U.S. Pat. No. 3,339,691. The primary differences between the issued patent and this invention are the capacity limitations involved in the structure of the patent which provides only a single inlet for discharge into a plurality of bins. The device provided herein increases the intake and discharge capacity by providing a dual inlet system with discharge being controlled therethrough to permit discharge into any one of selected delivery chutes for separate bins and also provides a means for feeding simultaneously from both outlets into a common bin.

With the device provided by applicant the difficulties of mixing or leaking material is eliminated and unrestricted flow is provided throughout the entire unit. These advantages are of prime importance and with the structure provided by applicant are obtainable.

It is therefore an object of applicant's device to provide a grain distributor or the like which will provide a high capacity distribution system receiving materials through a pair of inlets and distributing the same into any of selected storage bins.

It is a further object of applicant's device to provide a grain distributor unit including a first housing and a second housing generally overlying the first housing with inlets at the uppermost end thereof which provide an inlet delivering material through the second of said housings to a selected distribution member within the first of said housings and which provides a second inlet in the second of said housings which is completely independently locatable with respect to the discharge areas of the unit without disrupting flow from the first of said inlets.

It is still a further object of applicant's device to provide a multiple inlet grain distributor for discharging into a plurality of storage bins wherein the inlets may be so selected and directed so as to discharge into separate bins or to simultaneously discharge into a common bin without interrupting the flow through the separate inlets into its ultimate storage area.

These and other objects and advantages of my invention will more fully appear from the following description made in connection with the accompanying drawings, wherein like reference characters refer to the same or similar parts throughout the several views, and in which:

FIG. 1 is a vertical section along an axial centerline of a device embodying applicant's concepts;

FIG. 2 is a horizontal section taken substantially along line 2-2 of FIG. 1;

FIG. 3 is a vertical section similar to FIG. 1 illustrating the operative relation of the unit when one of the delivery devices therein is raised for selection of a discharge chute.

In accordance with the accompanying drawings the grain distributor provided by applicant is generally designated 10 and is illustrated on a support framing section 11 which in the form shown consists of uprights extending upwardly from a supporting surface although it should be obvious that such supporting struts could hang downwardly from a support surface. Crossmembers 12 for mounting the unit are provided rigidly attached thereto and in operation the device 10 would normally be in elevated position above the bins into which the discharge will be made.

The housing in the form shown includes a pair of individual housings designated respectively as an upper housing 15 and a lower housing 16. The housings 15, 16 are frustoconical in shape and respectively provide bottom plates 17, 18, side conical sections 19, 20 and a cover plate 21 for upper housing 15 with the upper cover of the lower housing 16 being provided by utilizing the exterior surface of the bottom plate 17 of the upper housing 15. The housing structure then provides a pair of enclosed frustoconical sections arranged in overlying attached relation to one another to provide in essence a pair of independent housings.

The lower surface plate 17, 18 of the respective housings is exemplified by the drawing of FIG. 2 which basically is a plan view of the bottom surface 17 of the upper housing 15 which illustrates in the form shown a plurality of discharge apertures 25 spaced arcuately therein. The apertures 25 in the form shown include a generally U-shaped arcuate portion 26 and a flat end portion 27 on the outer radial spaced end thereof with a notch element 28 formed in the outer surface 27 to provide a locating element as will be described hereinafter. Extending from these discharge apertures 25 are discharge chutes, designated 30 for the upper housing 15 and 31 for the lower housing 16. These chutes are rigidly attached to the exterior of the bottom surfaces of the respective housings and extend into discharge ducts respectively designated 30a—31a. It should be obvious that these discharge ducts extend to the various bins into which it is desired to store grain and in the form shown two styles of ducts are contemplated.

As illustrated in FIGS. 1 and 3 the left side of the drawing illustrates a joined duct system in which the extending discharge ducts 30a—31a are joined into a common member while on the right side the individual duct members 30a-31a extend independently from the respective housings for discharge into the storage bins. Obviously with the situation as exemplified on the right side of the drawings it is possible to simultaneously discharge from both of the housings into a common storage bin while not providing or permitting any slow down in the flow rate. The left side of the system illustrates a device in which if both the upper and lower housings were being discharged into the same bin at the same time an accumulation and backup of material could possibly result.

The cover plate 21 of the upper housing 15 is provided with, in the form shown, a pair of inlet ducts designated respectively 35—36 which are positively attached to the upper surface 21 and extend downwardly therethrough into the housing 15. A first of these ducts 35 is designed to discharge into an inverted cone system 37 wherein the lower exit end 38 of the cone is arranged generally centrally of the housing 15 and is in relatively close spaced relation to the bottom surface 17 thereof. Grain or material delivered through inlet 35 then passes into the cone 37 and downwardly centrally thereof to be discharged into and through the lower housing member 16 as will be discussed hereinafter.

The second inlet 36 discharges generally centrally of the cover plate 21 and inverted cone system 37.

An intermediate chute member 40 is arranged in the upper housing 15 and is arranged generally centrally of the aforementioned cone 37 and is provided of a size to have a sliding fit at its upper end 40a thereof with the downwardly extending inlet chute 36 at the upper end of housing 15. This particular intermediate chute 40 extends downwardly from the upper end 40a thereof angularly with respect to the axis of the unit and extends outwardly through an aperture 37a in the sidewall of the inverted cone 37. A positive attachment such as welding or the like is provided between this intermediate chute 40 and the sidewall aperture 37a of the inverted cone 37. A vertical disposition or discharge end 40b is provided on the intermediate chute 40 and is arranged in generally overlying relationship to the aforementioned discharge openings 25 in the lower housing plate 17.

Arranged on the radially outward end of the lower vertical discharge end 40b of intermediate chute 40 is a roller member 41 or the like which is of a size to be received in the notched apertures 28 of the discharge openings 25. The purpose of roller 41 is to positively locate the intermediate chute 40 above one of the discharge chutes 30 for discharge thereto. Positioning and locating of the intermediate chute 40 is providing through a lifting and turning device generally designated 50 which is arranged below and outwardly of the lower housing 16 and in the form shown includes a support member 51 and a pair of sliding axially arranged shafts 52-—53. The first of said shafts 52 is arranged to extend upwardly from the support element 51 through the housing 16 and into the inverted cone 37 to be positively and rigidly attached to the intermediate chute 40. The principle of this shaft 52 is to provide a means for lifting the shaft whereby the chute 40 will be lifted and the bearing or roller member 41 would be lifted from the notched section 28 of aperture 25 and a means to rotate the chute 40 and attached inverted cone 37 to shift the chute 40 into any of the various discharge openings 25 spaced therearound.

In order to accomplish this rotation and lifting system a first guide bearing 54 is provided on the lower portion 18 of the bottom housing 16 and both shafts 52—53 extend upwardly therethrough. A lower lever device 55 is provided pivotally attached through pin 55a onto the support frame 51 and is connected to the lower end of shaft 52. The connection between this lever and shaft must permit rotation of the shaft and this could obviously be provided by a thrust bearing-type connection. A control cable 56 is provided to actuate lever 55 and upon actuation of the cable 56 the shaft 52 and attached chute 40 will be lifted from a position as illustrated in FIG. 1 to a position as illustrated in FIG. 3 wherein the chute 40 and attached cone are lifted upwardly. In order to provide rotation for this now raised intermediate chute 40 and cone 37 a control wheel 60 is rigidly attached to shaft 52 and control cables 61 are provided to extend therefrom to a pair of outwardly arranged pulleys 62 which will permit rotation of the shaft 52 upon pulling the selected side of the cables 61. In this manner then it is possible to lift the intermediate chute 40 and the inverted cone 37 to permit proper placement of the intermediate chute 40 into one or another of the selected discharge apertures 5 for delivery into the proper storage bin.

The lower housing 16 again provides the same type of apertured lowered surface 18 having the plurality of apertures 25 therein which apertures are again, as illustrated in FIG. 2 provided with notches on the radially extending outward ends thereof to receive a roller member 70 or the like attached to an intermediate chute 71 arranged within the lower housing.

The lower intermediate chute 71 in the form shown consists of a generally vertical section 72 at the upper end thereof of a size to have a sliding fit about the lower end of the inverted cone 37 and an angularly arranged intermediate section extending again downwardly to a generally vertical section 73 which vertical section overlies the apertures 25 in the lower housing plate 18.

Movement is obtained for this lower intermediate chute 71 by again providing means to lift the same and to rotate the same. As mentioned previously shaft 53 is provided and is in the form shown attached to the intermediate chute 71 at its uppermost end 53a thereof. The lowermost end 53b of this chute is arranged below the lower housing member and again provides a lever system 74 pivoted to the support frame or to the lower plate 18 of the housing 16 through a pivot member 74a or the like with a control cable 75 arranged on the outward end of lever 74 to extend downwardly to permit actuation thereof thereby lifting the shaft 53 and the attached intermediate lower chute 71. Rotation for shaft 53 is again provided through a control wheel structure 76 secured to shaft 53 having cables 77 therearound extending to an outward pulley system 78 whereby rotation of the wheel 76 and shaft 53 may be obtained by pulling the proper cable 77. The structure of the lower housing member 16 and intermediate chute section 71 therein permits lifting of the intermediate chute 71 by the sliding fit of the upper end 72 thereof about the lower vertical section of the inverted cone 37. Lifting this intermediate chute 71 will lift the locating rollers 70 from the respective locating aperture 28 of the discharge apertures 25 and will permit rotation thereof until proper selection and proper discharge location is obtained and thereafter dropping of the intermediate chute 71 will properly position the discharge end 73 of the intermediate chute 71 in position to discharge into a properly selected bin.

It should be noted that the flow of grain through this second or lower housing is through the upper housing and the utilization of the inverted cone structure permits such flow without disturbing the upper housing area or disturbing the flow of grain through the upper intermediate chute 40. Location of the respective intermediate chutes 40, 71 will be possible at any time and it is not necessary to stop delivery through one chute to properly locate another such chute.

The uniqueness of the design permits dust free, positive and continuous line and controlled delivery of grains and other materials through the unit and provides a device which is simple in nature in comparison to any chute systems presently available.

It should be obvious that applicant has provided a new and unique grain distributor which has a high capacity as it provides a dual inlet system and which provides complete flexibility in discharging to various storage bins in that simultaneous discharge is available to any one bin or changes in bin locations for either of the discharges may be made at any time without affecting the operation of the other such system.

It will, of course, be understood that various changes may be made in the form, details, arrangements and proportion of parts without departing from the scope of my invention, which generally stated consists in the matter set forth in the appended claims.

We claim:

1. A grain distribution device including:
   a. a first housing having an upper and a lower portion;
   b. a plurality of outlet apertures provided in said first housing adjacent the lower portion thereof including a plurality of radially spaced and generally arcuately arranged apertures and a centrally arranged aperture;
   c. at least a pair of inlets adjacent the upper portion of said housing;
   d. a first grain transporting member frustoconical in shape and inverted in position having an open end on the larger end thereof which open end is arranged to generally underlie said inlets and being rotatably mounted within said housing and arranged and constructed to receive grain from a first of said inlets and discharge the same through said centrally arranged aperture; and
   e. a second grain transporting member arranged to underlie said second of said inlets and mounted to extend downwardly and outwardly through said frustoconical member for rotation with said first transporting member being arranged and constructed to receive grain from said second inlet throughout its rotative positions, having a discharge end for discharging into a selected arcuately arranged aperture.

2. The structure set forth in claim 1 and means for positively locating the discharge end of said second transporting member with respect to a selected one of said outlet apertures.

3. The structure set forth in claim 1 and:
   a. a second housing arranged to underlie said first housing and having an upper and a lower portion with a plurality of discharge apertures adjacent the lower portion thereof and arranged to receive grain from said first transporting member; and
   b. a third grain transporting member mounted in said second housing receiving grain from said first transporting member and being shiftable therein to discharge into a selected one of said discharge apertures.

4. The structure set forth in claim 3 and means for positively locating the discharge end of said third transporting member with respect to a selected one of said discharge apertures.